United States Patent
Oishi et al.

(10) Patent No.: US 8,075,432 B2
(45) Date of Patent: Dec. 13, 2011

(54) ENGINE UNIT AND STRADDLE TYPE VEHICLE

(75) Inventors: Akifumi Oishi, Shizuoka (JP); Yousuke Ishida, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 720 days.

(21) Appl. No.: 11/754,884

(22) Filed: May 29, 2007

(65) Prior Publication Data

US 2007/0295550 A1 Dec. 27, 2007

(30) Foreign Application Priority Data

May 30, 2006 (JP) .................................. 2006-149612

(51) Int. Cl.
*F16H 61/00* (2006.01)
*F16H 63/00* (2006.01)

(52) U.S. Cl. .......................................................... 474/70
(58) Field of Classification Search .................... 474/80, 474/8–29
See application file for complete search history.

(56) References Cited

U.S. PATENT DOCUMENTS

| | | | | | |
|---|---|---|---|---|---|
| 3,144,703 | A | * | 8/1964 | Einaudi et al. | 29/898.067 |
| 3,699,827 | A | * | 10/1972 | Vogel | 474/12 |
| 5,460,059 | A | * | 10/1995 | Kato | 74/89.22 |
| 5,591,100 | A | * | 1/1997 | Hayashi et al. | 477/44 |
| 5,882,124 | A | * | 3/1999 | Diemer et al. | 384/570 |
| 5,931,756 | A | * | 8/1999 | Ohsono et al. | 474/167 |
| 6,367,983 | B1 | * | 4/2002 | Muntnich et al. | 384/580 |
| 6,379,274 | B1 | * | 4/2002 | Robert | 474/19 |
| 6,398,679 | B1 | * | 6/2002 | Brown | 474/35 |
| 6,435,994 | B1 | * | 8/2002 | Friedmann et al. | 474/145 |
| 6,926,632 | B2 | * | 8/2005 | Brown | 474/35 |
| 7,201,686 | B2 | * | 4/2007 | Masuda et al. | 474/144 |
| 2001/0034280 | A1 | * | 10/2001 | Kuga et al. | 474/8 |
| 2004/0018903 | A1 | | 1/2004 | Takagi | |
| 2005/0192785 | A1 | | 9/2005 | Lewis et al. | |
| 2005/0221927 | A1 | * | 10/2005 | Chonan | 474/15 |

FOREIGN PATENT DOCUMENTS

| | | |
|---|---|---|
| EP | 0 288 080 A1 | 10/1988 |
| EP | 0 483 764 A1 | 5/1992 |
| JP | 2003-301903 | 10/2003 |
| JP | 2004-251391 | 9/2004 |
| WO | WO2005007499 A1 * | 1/2005 |

OTHER PUBLICATIONS

Official Communication issued in corresponding European Patent Application No. 07251943, mailed on Jul. 30, 2010.

* cited by examiner

*Primary Examiner* — Michael Mansen
*Assistant Examiner* — Robert Reese
(74) *Attorney, Agent, or Firm* — Keating & Bennett, LLP

(57) ABSTRACT

In an engine unit of a straddle type vehicle, a V-belt-type continuously variable transmission (CVT) has a secondary sheave shaft 62 that rotates with a clutch housing of a centrifugal clutch. The secondary sheave shaft is supported in a cantilever fashion via two bearings. The engine unit has a gear that rotates with a clutch boss. Cage-and-roller needle bearings, which are a type of needle bearing, are inserted between the secondary sheave shaft and the gear. In this manner, without enlarging the engine unit, abrasions and deterioration of a bearing inserted between a rotational shaft supported in a cantilever fashion and a body of rotation are prevented.

18 Claims, 15 Drawing Sheets

[FIG. 1]
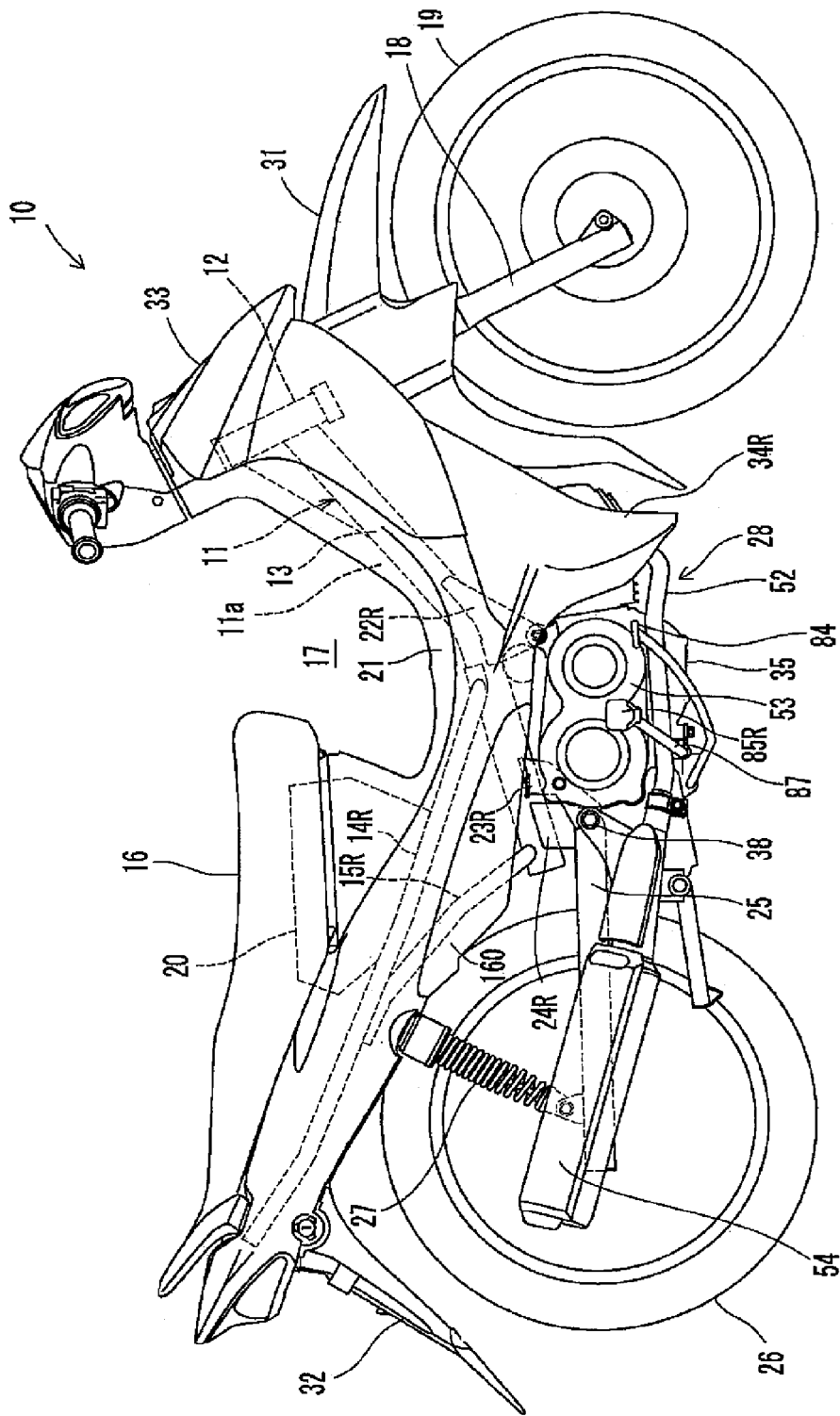

[FIG. 2]
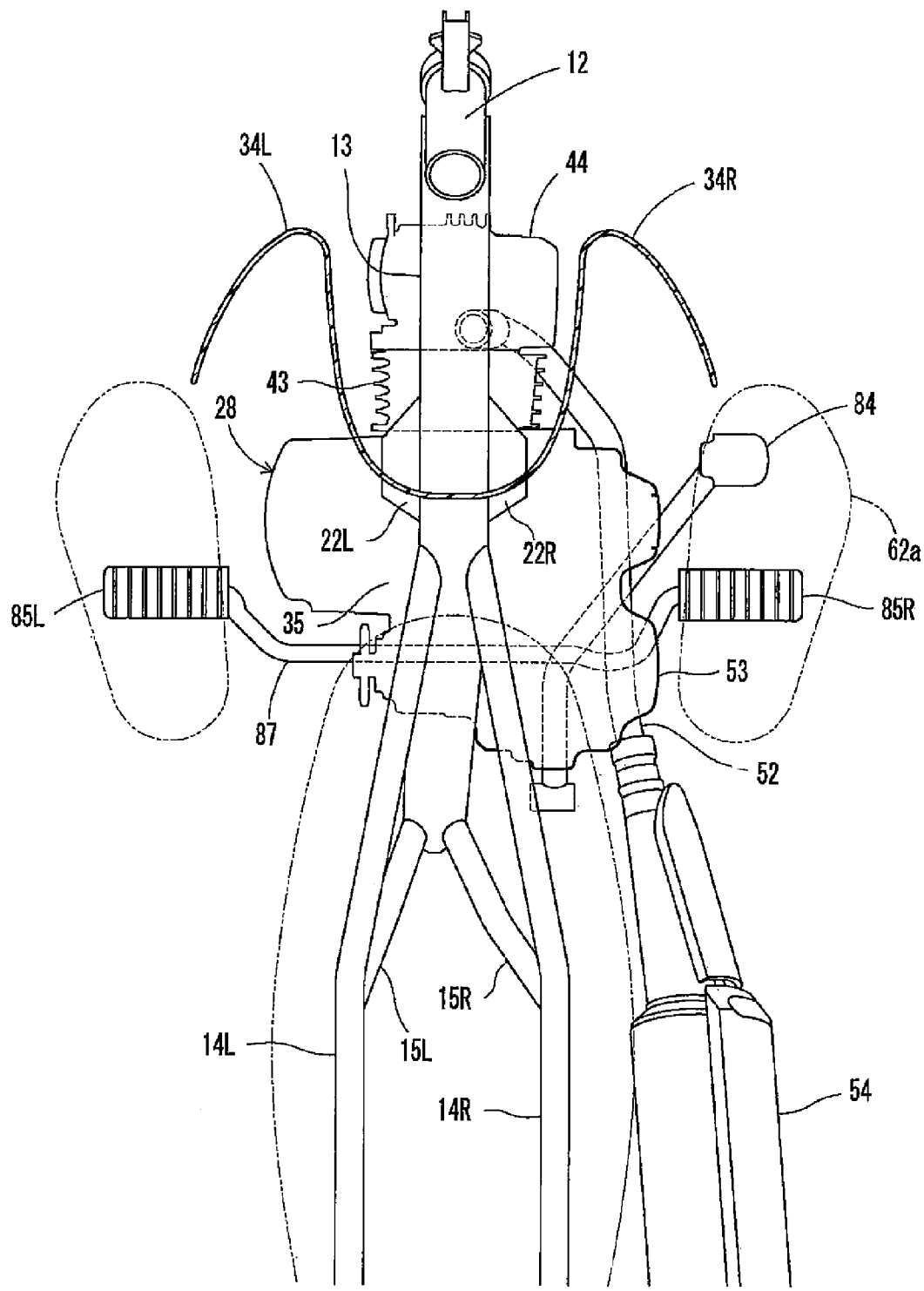

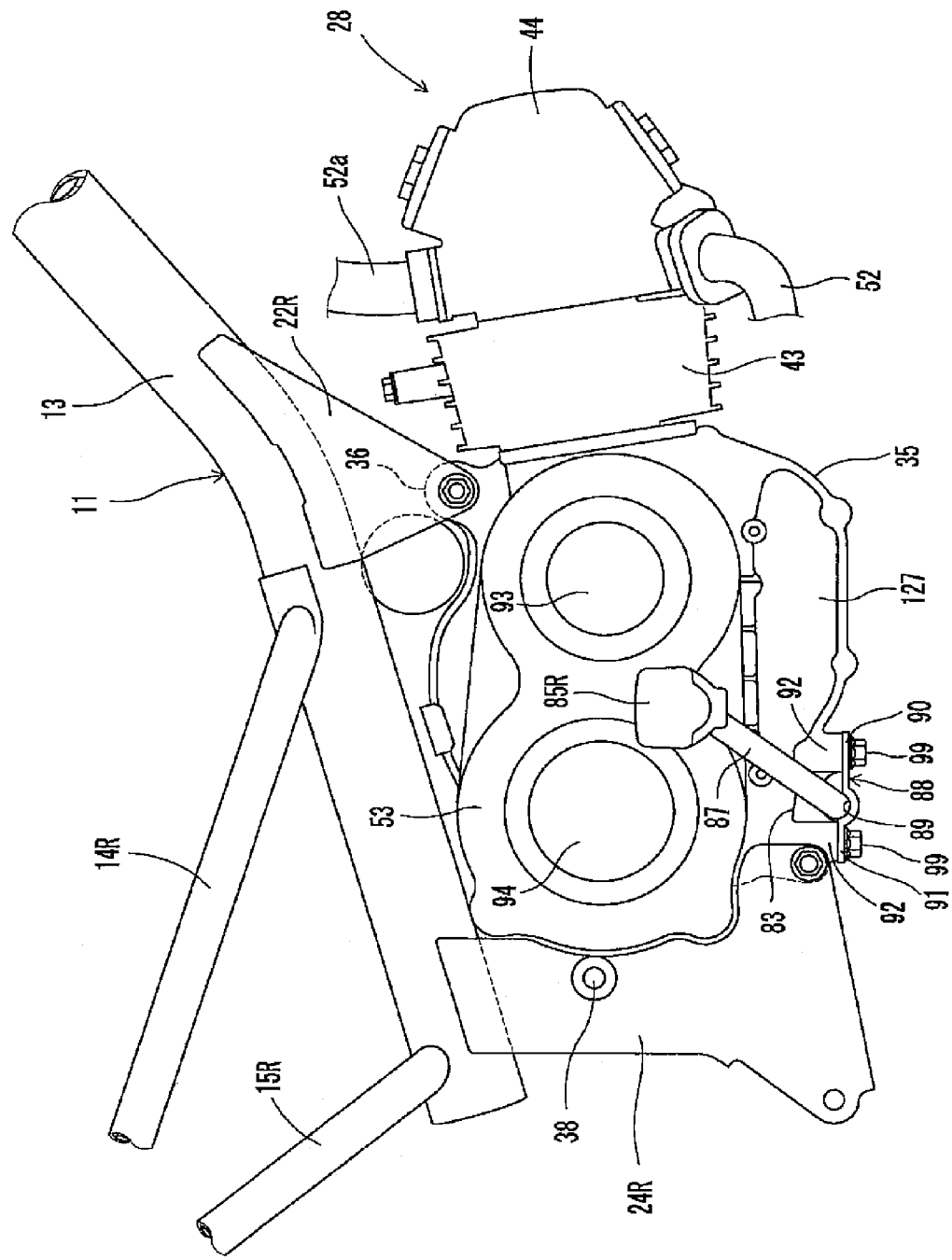
[FIG. 3]

[FIG. 4]
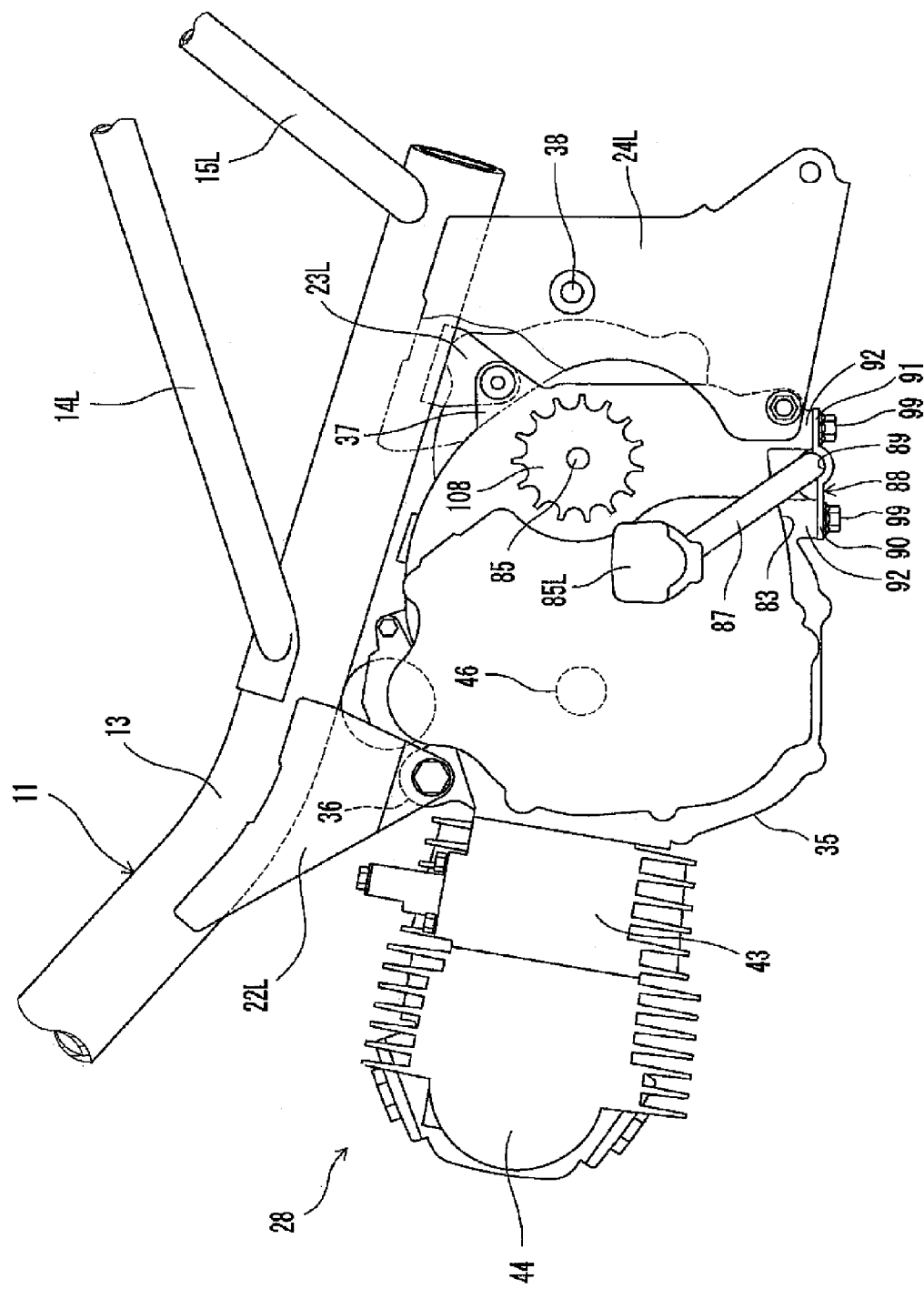

[FIG. 5]
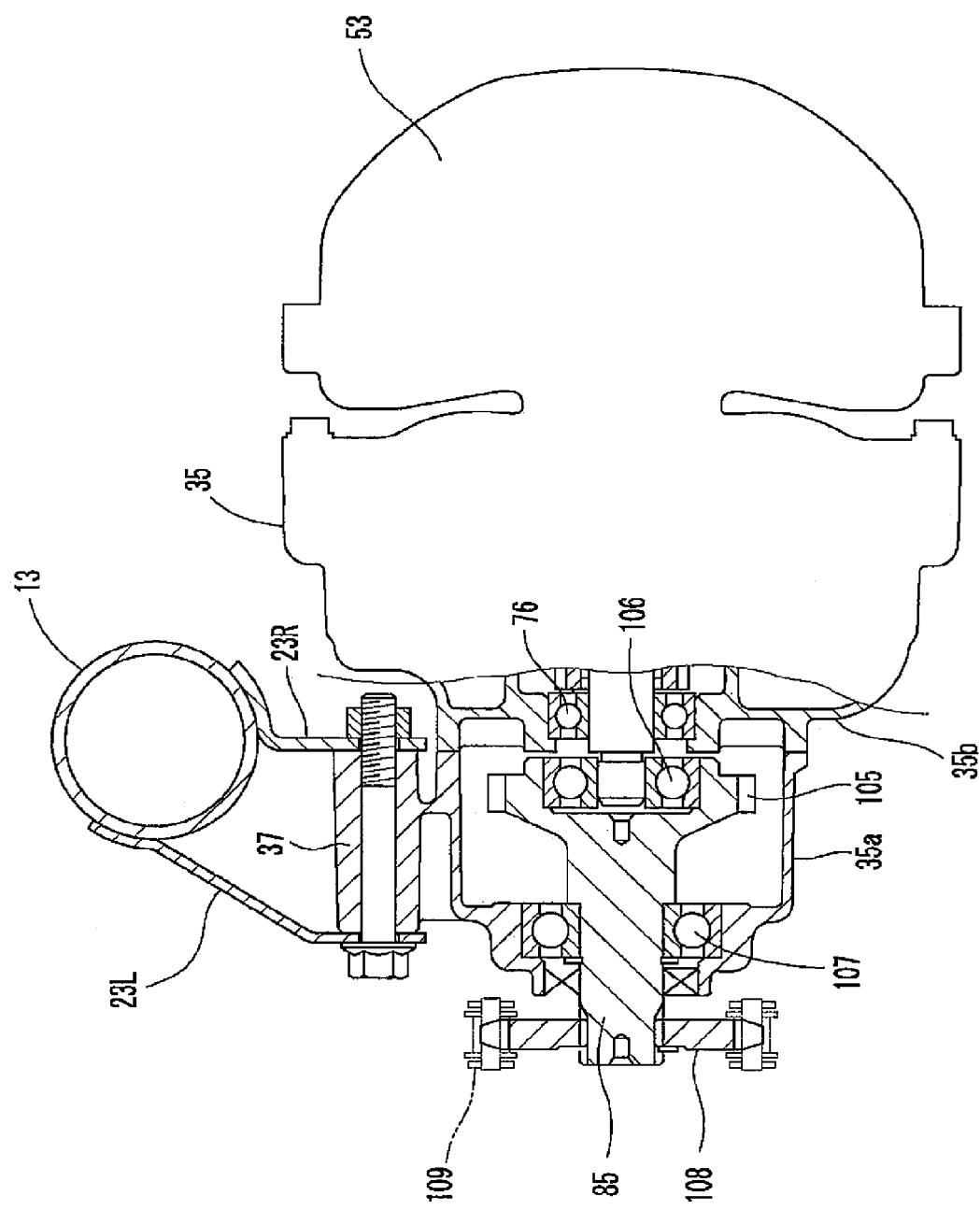

[FIG. 6]
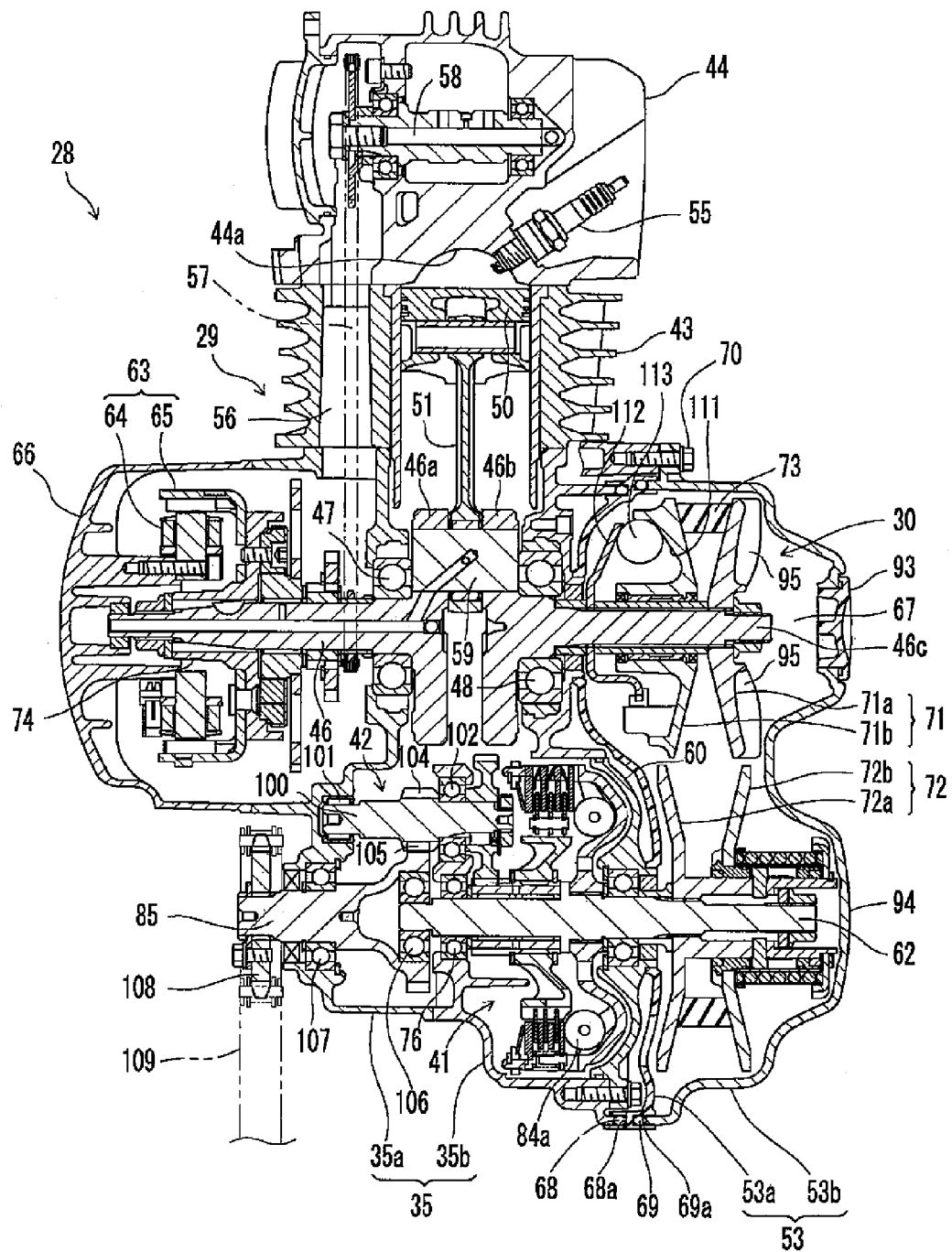

[FIG. 7]
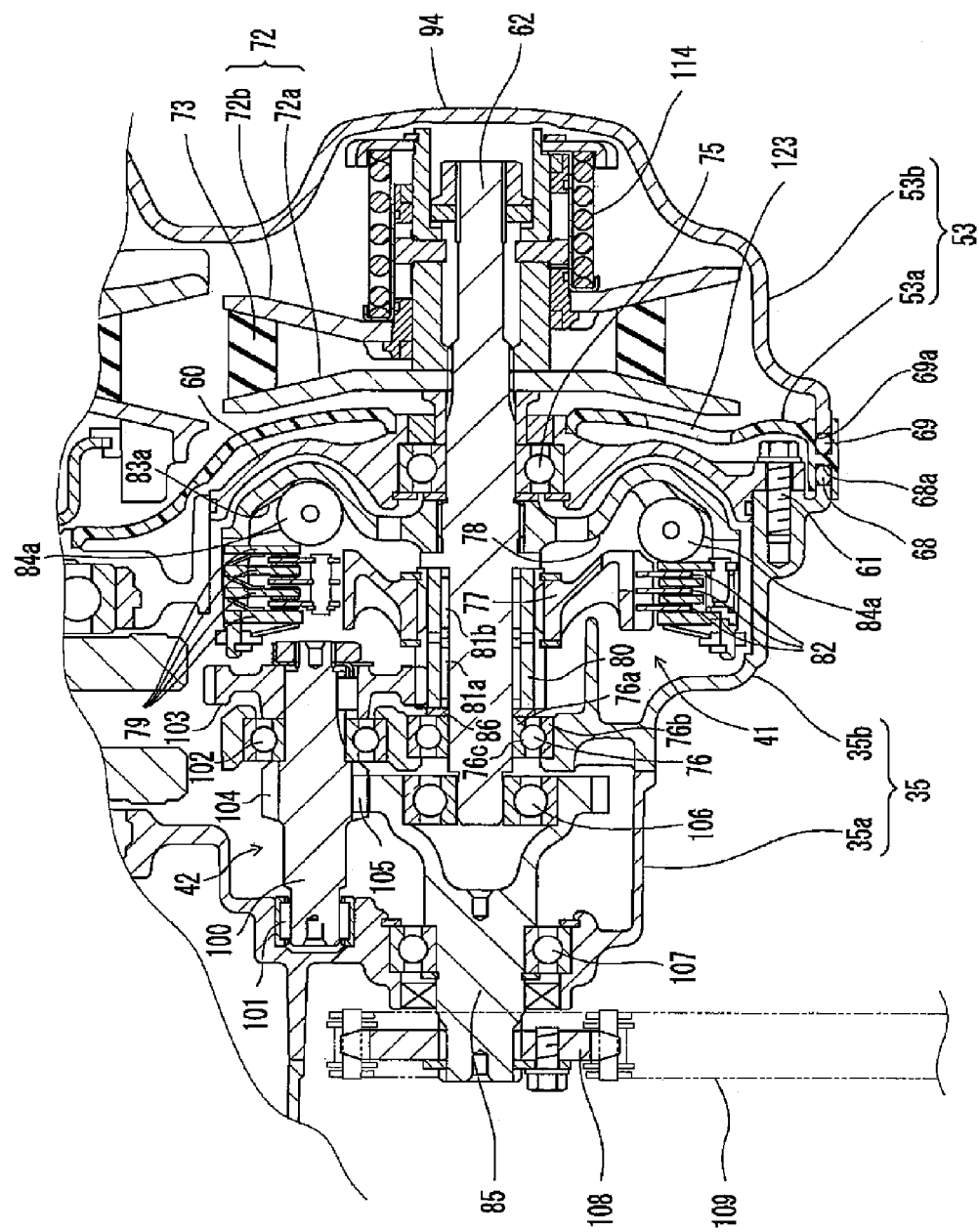

[FIG. 8]
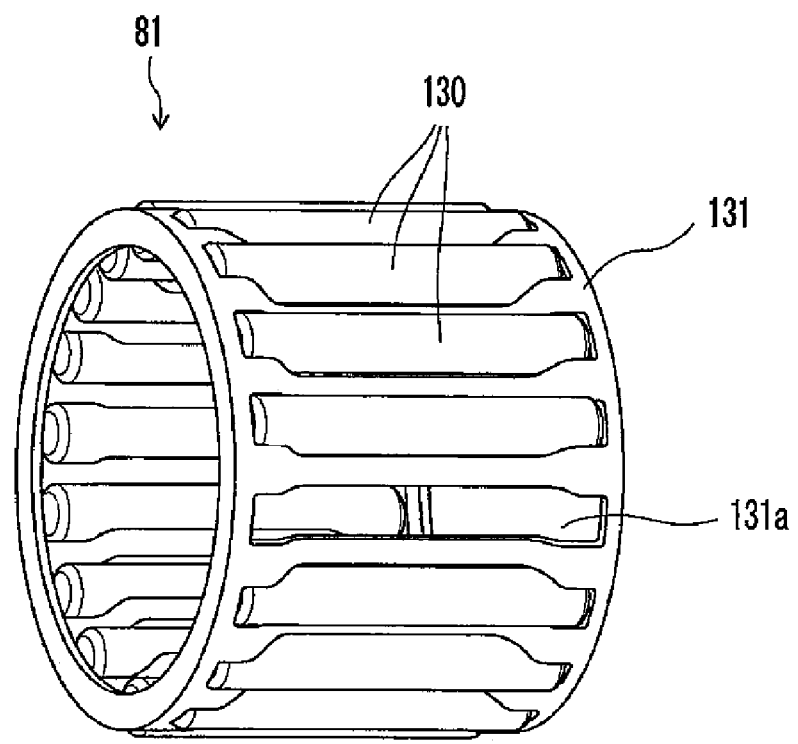

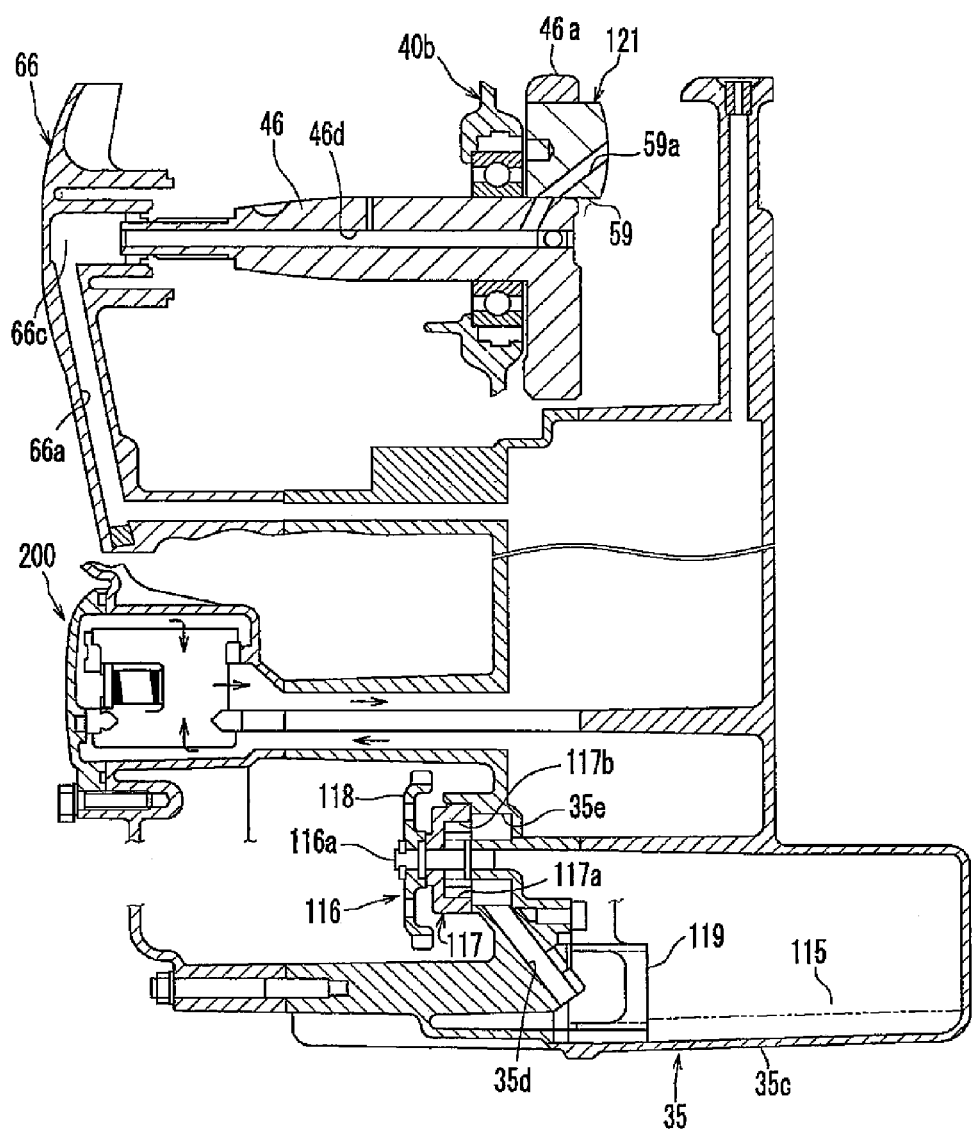
[FIG. 9]

[FIG. 10]
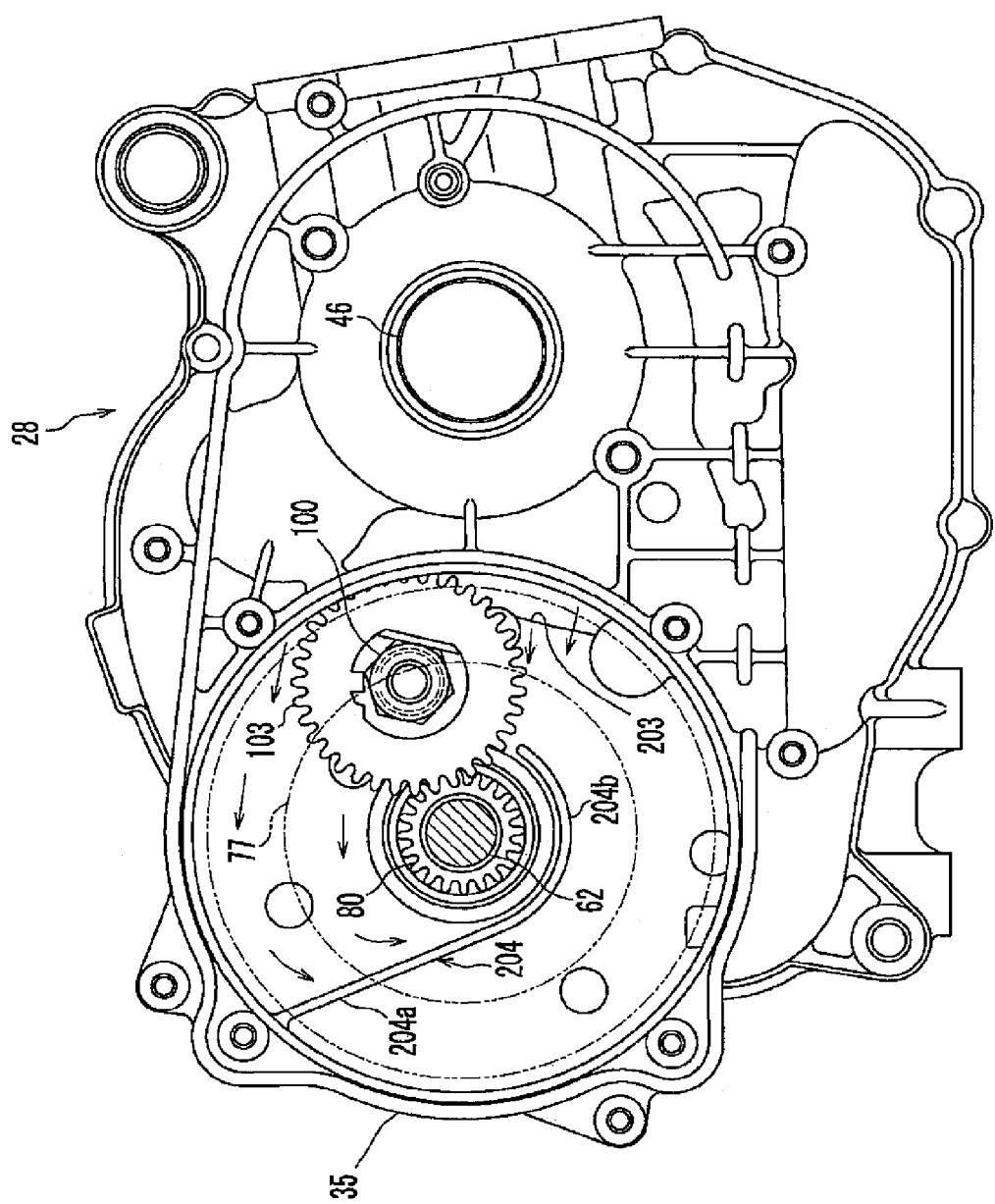

[FIG. 11]
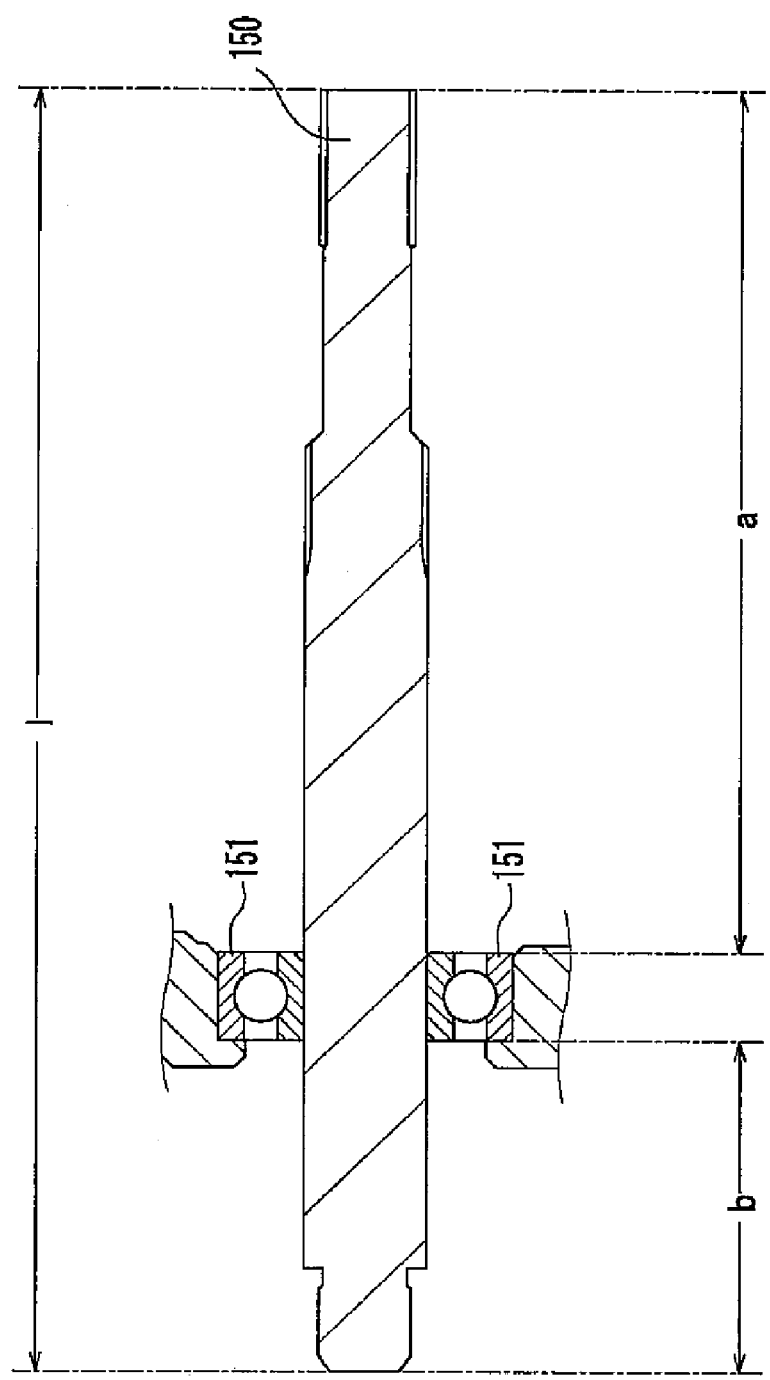

[FIG. 12]
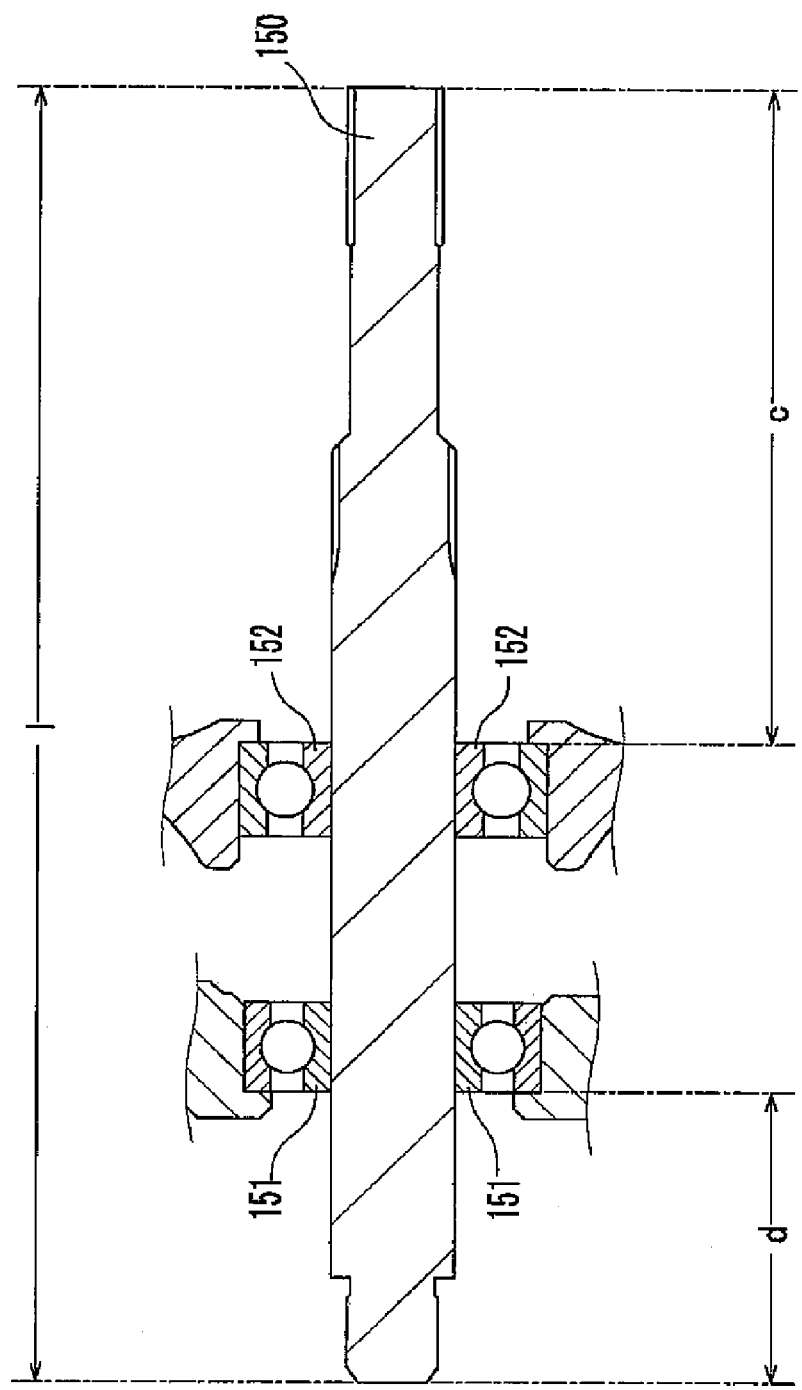

[FIG. 13]
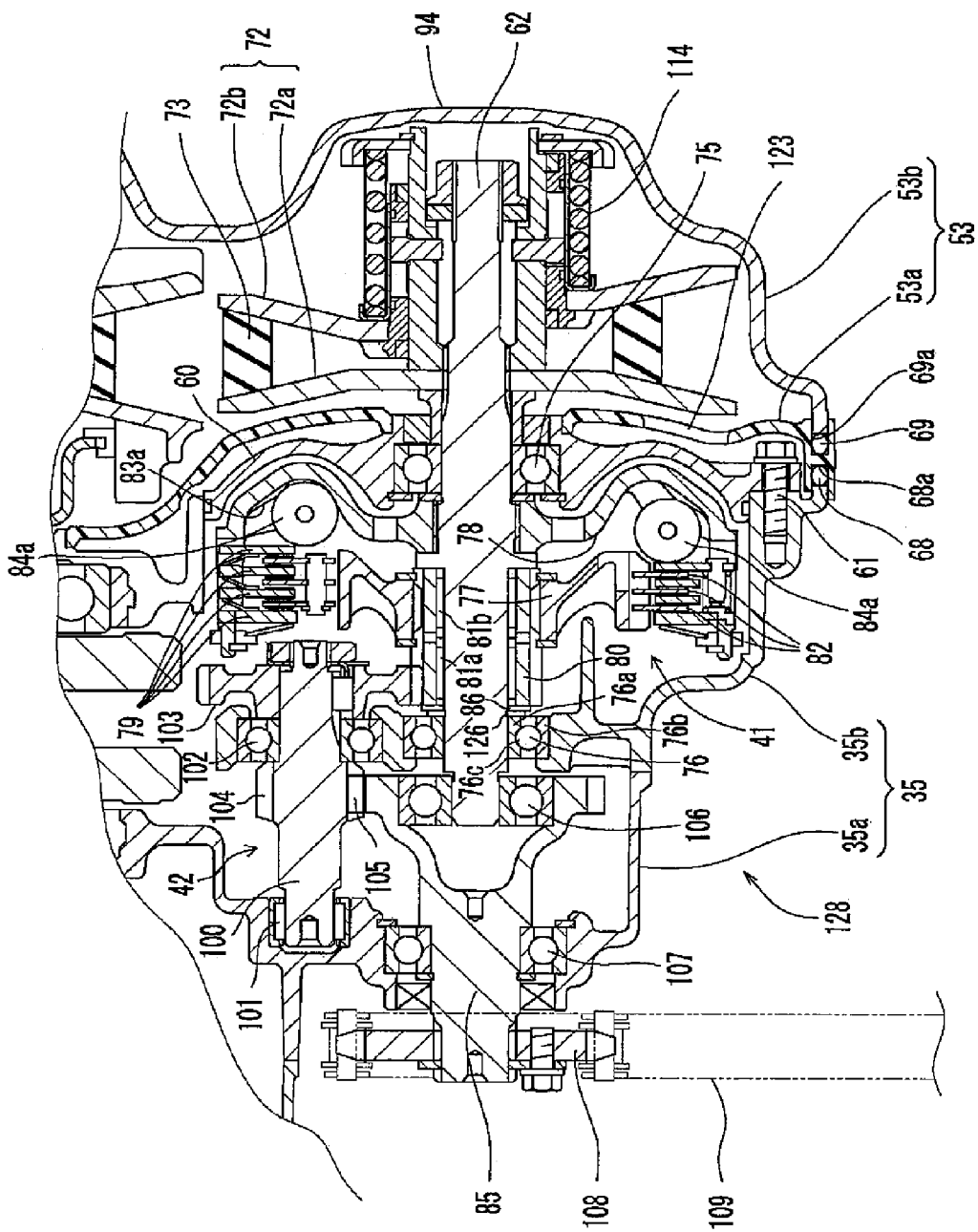

[FIG. 14]
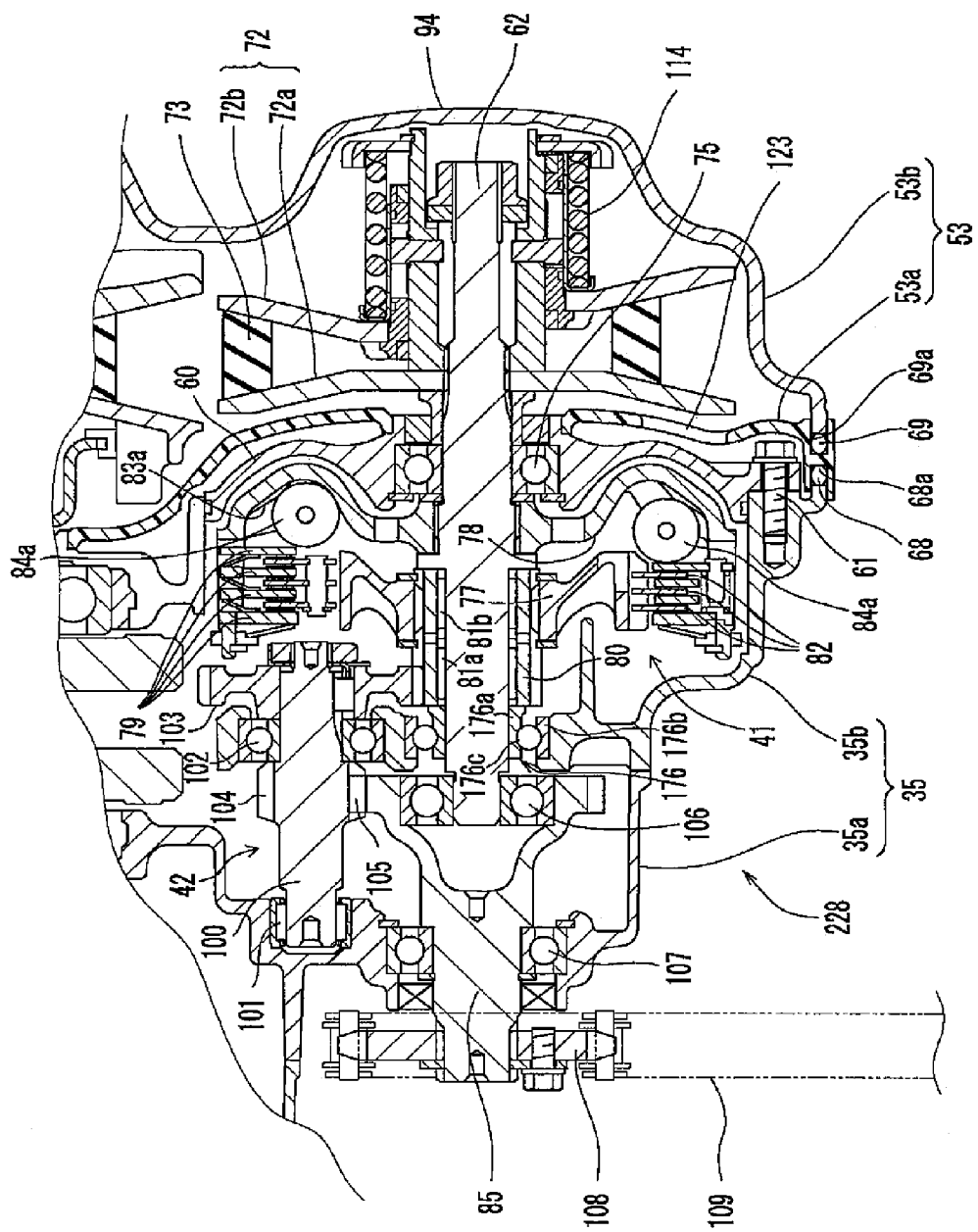

[FIG. 15]
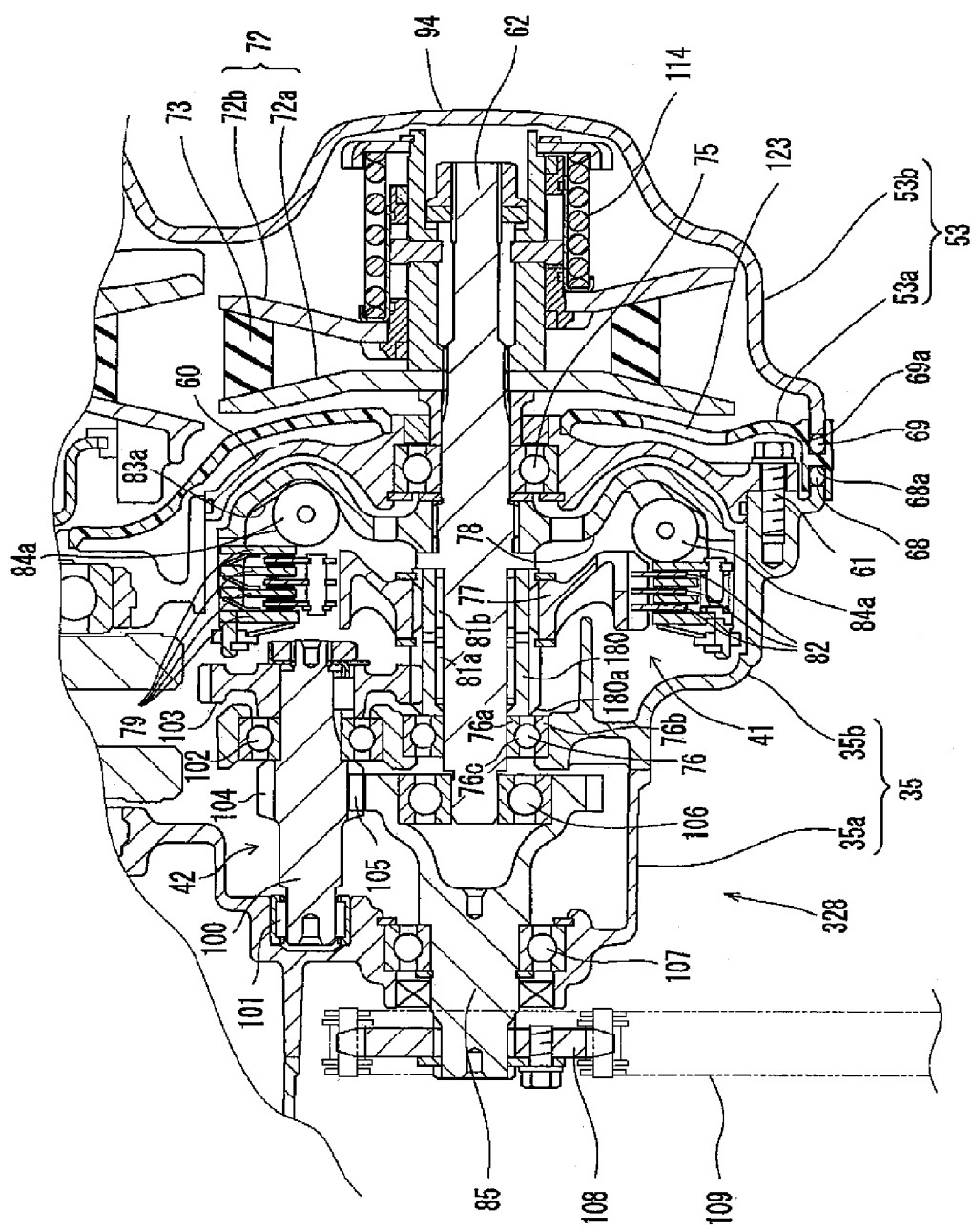

ENGINE UNIT AND STRADDLE TYPE VEHICLE

RELATED APPLICATIONS

This application claims the benefit of priority under 35 USC 119 of Japanese patent application no. 2006-149612, filed on May 30, 2006, which application is hereby incorporated by reference in its entirety.

BACKGROUND OF THE INVENTION

1. Field of the Invention

The present invention relates to an engine unit for a straddle type vehicle.

2. Description of Related Art

Conventionally, there has been known an engine unit including a metal bearing disposed between a rotational shaft fixed to the clutch housing of a centrifugal clutch and rotated therewith and a gear fixed to the clutch boss of the centrifugal clutch and rotated therewith for the purpose of downsizing the unit (for example, see JP-A-2003-301903 and JP-A-2004-251391).

While an engine is idling, the rotational speed of the engine is low, and the centrifugal clutch is OFF (disconnected). Accordingly, the rotational shaft is rotating, but the gear is not rotating. This means that the rotational shaft and the gear are relatively rotating. In contrast, when the vehicle is being driven, the engine speed is high, and the centrifugal clutch is ON (connected). Accordingly, the rotational shaft and the gear are rotating together. This means that the rotational shaft and the gear are not relatively rotating.

As mentioned above, the rotational shaft and the gear relatively rotate only when the engine is idling. During idling operation, the engine speed is kept low. Therefore, it has been believed that abrasions and deterioration of the metal bearing caused by the relative rotation rarely happen.

However, the inventers of the present invention have found through examinations that abrasions and deterioration of metal bearings occur in dependence on conditions of installation of a rotational shaft even when the rotational shaft and a gear do not relatively rotate. More specifically, even if the amount of lubricating oil is increased, abrasions and deterioration of metal bearings occur in a case where the rotational shaft is supported in a cantilever fashion and there is a relatively large difference between respective ratios of lengths of both parts of the rotational shaft which are not supported.

Noticing this, the inventors of the present invention strenuously studied to find the cause of the abrasions and deterioration, and found the cause. The abrasions and deterioration occur because of a mutual prying motion between the rotational shaft and the gear in a structure where the rotational shaft is supported in a cantilever manner even if the rotational shaft and the gear do not relatively rotate. The non-coaxial rotation causes an area where a good oil film is not formed between the outer ring and the inner ring of the metal bearing. In the area, a friction is generated, so that abrasions and deterioration of the metal bearing occur.

SUMMARY OF THE INVENTION

With this considered, the present invention is made. The object of the present invention is to prevent abrasions and deterioration of a bearing interposed between a rotational shaft supported in a cantilever fashion and a body of rotation.

The engine unit according to the present invention includes a rotational shaft rotated with a drive force provided, a first bearing into which the rotational shaft is inserted, and a body of rotation into which the first barging is inserted, and a second bearing into which the rotational shaft is inserted, wherein the rotational shaft is supported in a cantilever fashion via the second bearing, and the first bearing is a needle bearing.

The engine unit including the rotational shaft supported in a cantilever fashion by the second bearing has the needle shaft (the first bearing), which is a rotational bearing, between the rotational shaft and the body of rotation. Therefore, abrasions and deterioration of the bearing can be reduced even when the rotational shaft and the body of rotation rotate to mutually pry.

The present invention can reduce abrasions and deterioration of the bearing interposed between the rotational shaft supported in a cantilever fashion and the body of rotation in the engine unit including the rotational shaft supported in a cantilever fashion.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a side view of a two-wheel motor vehicle according to an embodiment of the invention.

FIG. 2 is a plan view of the vehicle of FIG. 1, illustrating arrangements of a body frame, a leg shield, an engine unit, and so forth.

FIG. 3 is a right side view of the engine unit.

FIG. 4 is a left side view of the engine unit.

FIG. 5 is a cross-sectional view showing a state where the engine unit is installed.

FIG. 6 is a cross-sectional view of the internal structure of the engine unit.

FIG. 7 is a cross-sectional view of a part of the internal structure of the engine unit.

FIG. 8 is a perspective view of a cage-and-roller needle bearing according to an embodiment of the invention.

FIG. 9 is a cross-sectional view of a part of the internal structure of the engine unit.

FIG. 10 is a cross-sectional view in the vicinity of the secondary sheave and the transmission shaft of the engine unit.

FIG. 11 is a schematic view of a shaft supported by a bearing according to an embodiment of the invention.

FIG. 12 is a schematic view of a shaft supported by a bearing according to an embodiment of the invention.

FIG. 13 is a cross-sectional view of a part of the internal structure of an engine unit according to another embodiment of the invention.

FIG. 14 is a cross-sectional view of a part of the internal structure of an engine unit according to still another embodiment of the invention.

FIG. 15 is a cross-sectional view of a part of the internal structure of an engine unit according to a further embodiment of the invention.

DETAILED DESCRIPTION OF THE INVENTION

An embodiment of the present invention is now described in detail with reference to the accompanying drawings.

As shown in FIG. 1, a straddle type vehicle according to the present invention is a two-wheel motor vehicle 10. Vehicle 10 includes a body frame 11 forming a framework and a seat 16 on which a rider sits. Vehicle 10 is a two-wheel motor vehicle of a so-called moped type. More specifically, vehicle 10 has a concave-side-view space 17, which is concave toward an upward direction, in front of the seat 16 for the rider sitting to step over the body frame 11 in order to ride the vehicle. The wording "moped type" refers only to the appearance of the vehicle, and is not intended to limit the maximum speed, displacement, size or other aspects of the vehicle.

The present invention is not limited to moped type vehicles, but is also applicable to other two-wheel motor vehicles such as motorcycle type vehicles having a fuel tank in front of the seat.

In the following description, horizontal positions such as the front, the rear, the left, and the right refer to positions viewed by a rider sitting on the seat 16. The body frame 11 has a steering head pipe 12, a main frame 13 extending obliquely downward and rearward from the steering head pipe 12, seat rails 14L, 14R on the left and right sides extending obliquely upward and rearward from a middle part of the main frame 13 in an upper rear direction, and seat pillar tubes 15L, 15R on the left and right sides connected with a rear end part of the main frame 13 and with middle parts of the seat rails 14L, 14R.

Upper spaces and left and right spaces of the body frame 11 are covered with a body cover 21. Concave-side-view space 17 which is concave in a downward direction is defined on the upper side of the body cover 21 and in front of the seat 16. A center opening 11a, through which main frame 13 goes, is defined under the body cover 21.

A front wheel 19 is linked via a front fork 18 to the steering head pipe 12. A fuel tank 20 and the seat 16 are supported on the seat rails 14L, 14R. The seat 16 extends from an upper space above the fuel tank 20 in the direction of rear ends of the seat rails 14L, 14R. The fuel tank 20 is positioned in a space above front halves of the seat rails 14L, 14R, and covered with the body cover 21 and the seat 16.

A pair of first engine brackets 22L, 22R on the left and right sides extend downward in a middle part of the main frame 13. A pair of second engine brackets 23L, 23R and rear arm brackets 24L, 24R on the left and right sides, respectively, are formed on the rear end of the main frame 13. The brackets on the main frame 13 and others including, more specifically, the first engine brackets 22L, 22R, the second engine brackets 23L, 23R, the rear arm brackets 24L, 24R, and so forth form parts of the body frame 11.

The rear arm brackets 24L, 24R protrude downward from the rear end of the main frame 13. To the rear arm brackets 24L, 24R, a pivot shaft 38 is installed. The front end of a rear arm 25 is supported in a movable manner by the pivot shaft 38. A rear wheel 26 is supported by the rear end of the rear arm 25. The rear half of the rear arm 25 is suspended by the body frame 11 via a cushion unit 27.

As shown in FIG. 5, the second engine brackets 23L, 23R protrude downward from the rear end of the main frame 13. The second engine brackets 23L, 23R on the left and right sides face each other in the width direction of the vehicle with a space between them.

As shown in FIG. 1, the body frame 11 supports an engine unit 28 for driving the rear wheel 26. More specifically, as shown in FIG. 4, the engine unit 28 has a crankcase 35, a cylinder 43 and a cylinder head 44. The crankcase 35 has first and second engine mount sections 36 and 37. The first engine mount section 36 protrudes obliquely upward and rearward from the upper side of the front end of the crankcase 35, and is supported by the first engine brackets 22L, 22R. The second engine mount section 37 protrudes upward from the upper side of the rear end of the crankcase 35 in the upper rear direction, and is supported by the second engine brackets 23L, 23R (see also FIG. 5). Therefore, the crankcase 35 is supported and suspended by the main frame 13.

As described below in detail, the engine unit 28 has an engine 29 and a belt-type continuously variable transmission hereinafter refereed to as CVT) 30 (see FIG. 6). In the embodiment, engine 29 is a 4-cycle 1-cylinder engine. However, the invention is not limited to this type of engine.

As shown in FIG. 1, the two-wheel motor vehicle 10 has a front fender 31 for covering an upper space and a rear space of the front wheel 19 and a rear fender 32 for covering an upper space in an upper rear direction of the rear wheel 26.

In addition to body cover 21, the two-wheel motor vehicle 10 has a front cowling 33 and leg shields 34L, 34R on the left and right sides. The leg shields 34L, 34R are members for covering front sides of the legs of the driver, and extend obliquely from the bottom to the top thereof when viewed from a side. The leg shields 34L, 34R may be formed in one body with or separated from the front cowling 33.

As shown in FIG. 2, a cross-section in a horizontal direction of the leg shields 34L, 34R is in the shape of a concave that is open rearward. In other words, the cross-section in the horizontal direction of the leg shields 34L, 34R is similar to a curve generally in the shape of letter "C" pointed forwardly. Therefore, on the rear sides of the leg shields 34L, 34R (inside of the concave opening), spaces with their front sides and left and right sides covered with the leg shields 34L, 34R, respectively, are defined.

In the embodiment, the leg shields 34L, 34R are made of a resin material. However, the material of the leg shields 34L, 34R is not at all limited.

As shown in FIG. 2, footrests 85L, 85R made of rubber or the like are arranged on the left and right sides of the engine unit 28. The footrests 85L, 85R are supported by the crankcase 35 via a metal connecting rod 87 and a mounting plate 88 (see FIG. 3 and FIG. 4) fixed by the connecting rod 87.

The connecting rod 87 passes below the rear half of the crankcase 35 and extends in the width direction of the vehicle. The left end of the connecting rod 87 protrudes on the left side of the crankcase 35, supporting the footrest 85L. The right end of the connecting rod 87 protrudes on the right side of a transmission case 53, supporting the footrest 85R. As shown in FIG. 3, the mounting plate 88 is formed by a pressing process. A concave section 89 for holding connecting rod 87 is formed in the middle of the mounting plate 88. The concave section 89 is engaged with the connecting rod 87 from the bottom, and welded to the outer peripheral of the connecting rod 87.

The mounting plate 88 has a first fixing section 90 in the shape of a flange protruding forward from connecting rod 87 and a second fixing section 91 in the shape of a flange protruding rearward from connecting rod 87. The first fixing section 90 and the second fixing section 91 extend in the axial direction (the left-and-right direction) of the connecting rod 87, and face a bottom surface 83 on the rear half of the crankcase 35.

The bottom surface 83 on the rear half of the crankcase 35 has four bosses 92 (two bosses are shown in FIG. 3). The bosses 92 protrude downward from the bottom surface 83 of the crankcase 35, and are formed integrally with the crankcase 35. In each of the bosses 92, a bolt hole (not shown) is formed. In the mounting plate 88 for the footrests 85L, 85R, bolt holes (not shown) are also formed in positions corresponding to the bosses 92. The mounting plate 88 and the boss 92 are fixed with bolts 99. As mentioned above, the footrests 85L, 85R are fixed on the crankcase 35 by the bolts 99 via the connecting rod 87 and the mounting plate 88.

As shown in FIG. 1 and FIG. 2, a brake pedal 84 is installed in front of the footrest 85R on the right side. The brake pedal 84, passing a bottom space of the transmission case 53, protrudes in the front right direction, and extends in the upper front direction in the right side space of the transmission case 53. As shown in FIG. 2, while the two-wheel motor vehicle 10 drives, the right foot 62a of the driver is beside the transmission case 53 in the width direction of the vehicle.

The internal structure of engine unit 28 is now described. As shown in FIG. 6, the engine unit 28 comprises the engine 29, the CVT 30, a centrifugal clutch 41, and a decelerator 42.

Engine 29 comprises crankcase 35, cylinder 43 connected with crankcase 35, and cylinder head 44 connected with cylinder 43. The crankcase 35 has two divided block cases: a first case block 35a on the left side and a second case block 35b on the right side. Case blocks 35a and 35b meet each other in the width direction of the vehicle.

A crankshaft 46 is housed in the crankcase 35. The crankshaft 46 extends in the width direction of the vehicle, and is arranged horizontally. The crankshaft 46 is supported by the first case block 35a via a bearing 47 and by the second case block 35b via a bearing 48.

A piston 50 is inserted in the cylinder 43 to slide therein. One end of a connecting rod 51 is coupled with the piston 50. A crank pin 59 is installed between a left crank arm 46a and a right crank arm 46b of the crankshaft 46. The other end of the connecting rod 51 is coupled with the crank pin 59.

A concave 44a and an intake and an exhaust port (not shown) connected with the concave 44a are formed in the cylinder head 44. A spark plug 55 is inserted in the concave 44a of the cylinder head 44. As shown in FIG. 3, an intake pipe 52a is connected with the intake port, and an exhaust pipe 52 is connected with the exhaust port. As shown in FIG. 1 and FIG. 2, the exhaust pipe 52 extends from the cylinder head 44 rearward in a lower right direction before further extending rearward passing through a space below the transmission case 53 of the engine unit 28, and is connected with a muffler 54 positioned in a right side space of the rear wheel 26.

As shown in FIG. 6, a cam chain chamber 56 for connecting the inside of the crankcase 35 and the inside of the cylinder head 44 is formed in the left side section of the cylinder 43. A timing chain 57 is arranged in the cam chain chamber 56. The timing chain 57 is engaged with the crankshaft 46 and a camshaft 58. The camshaft 58 rotates as the crankshaft 46 rotates, and opens and closes an intake valve and an exhaust valve (not shown).

A generator case 66 for housing a generator 63 is installed detachably in the left side of the front half of the first case block 35a. Transmission case 53 for housing CVT 30 is installed on the right side of the second case block 35b.

An opening is formed on the right side of the rear half of the second case block 35b and is covered with a clutch cover 60. The clutch cover 60 is detachably fixed in the second case block 35b with a bolt 61.

The transmission case 53 is formed independently from the crankcase 35, and is formed with an inner case 53a for covering the CVT 30 at the inner side (the left side) in the vehicle width direction and with an outer case 53b for covering the CVT 30 at the outer side (the right side) in the vehicle width direction. The inner case 53a is installed on the right side of the crankcase 35, while the outer case 53b is installed on the right side of the inner case 53a. A belt chamber 67 for housing the CVT 30 is formed in the inner case 53a and the outer case 53b.

As shown in FIG. 6, the right end of the crankshaft 46 passes through the second case block 35b and the inner case 53a, and extends into the belt chamber 67. A primary sheave 71 of the CVT 30 is fixed on the right end of the crankshaft 46. Therefore, the primary sheave 71 rotates with rotation of the crankshaft 46. The right part of the crankshaft 46 (more specifically, a portion on the right side of the bearing 48) forms a primary sheave shaft 46c.

On the other hand, the left end of the crankshaft 46 passes through the first case block 35a, and extends into the generator case 66. Generator 63 is installed on the left end of the crankshaft 46 and has a stator 64 and a rotor 65 in cooperation with the stator 64. The rotor 65 is fixed on a sleeve 74, which rotates with the crankshaft 46. The stator 64 is fixed in the generator case 66.

A secondary sheave shaft 62 is arranged in parallel with the crankshaft 46 in the rear half of the crankcase 35. The secondary sheave shaft 62 is the shaft mentioned above. As shown in FIG. 7, the secondary sheave shaft 62 is supported, at the middle thereof, by the clutch cover 60 via a bearing 75. The left side of the secondary sheave shaft 62 is supported by the left end of the second case block 35b via a bearing 76. The bearings 75, 76 are the second bearing mentioned above. The bearing 75 is positioned generally at the middle of the secondary sheave shaft 62. The distance from the bearing 75 to the right end of the secondary sheave shaft 62 is from a half to a third of the entire length of the secondary sheave shaft 62. Therefore, the secondary sheave shaft 62 is supported in a cantilever fashion by the bearing 75 and the bearing 76.

The right end of the secondary sheave shaft 62 passes through the second case block 35b and the clutch cover 60, and extends into the belt chamber 67. A secondary sheave 72 of the CVT 30 is coupled with the right end of the secondary sheave shaft 62.

As shown in FIG. 6, the CVT 30 has the primary sheave 71, the secondary sheave 72, and a V belt 73 engaging with the primary sheave 71 and the secondary sheave 72. As mentioned above, the primary sheave 71 is installed on the right side of the crankshaft 46. The secondary sheave 72 is connected with the right side of the secondary sheave shaft 62.

The primary sheave 71 has a fixing sheave 71a positioned outside in the vehicle width direction and a movable-sheave half 71b positioned on the inside in the vehicle width direction and facing the fixing sheave 71a. The fixing sheave 71a is fixed on the right end of the primary sheave shaft 46c, and rotates with the primary sheave shaft 46c. The movable-sheave half 71b is arranged on the left side of the fixing sheave 71a, and fixed on the primary sheave shaft 46c in a slidable manner. Therefore, the movable-sheave half 71b rotates with the primary sheave shaft 46c, and is slidable in the axial direction of the primary sheave shaft 46c. A belt ditch is formed between the fixing sheave 71a and the movable-sheave half 71b. A cam surface 111 is formed on the left side of the movable-sheave half 71b. A cam plate 112 is arranged on the left side of the cam surface 111. A roller weight 113 is positioned between the cam surface 111 of the movable-sheave half 71b and the cam plate 112.

The secondary sheave 72 has a fixing-sheave half 72a positioned inside in the vehicle width direction and a movable-sheave half 72b positioned outside in the vehicle width direction and facing the fixing-sheave half 72a. The movable-sheave half 72b is fixed on the right end of the secondary sheave shaft 62. The movable-sheave half 72b rotates with the secondary sheave shaft 62, and is slidable in the axial direction of the secondary sheave shaft 62. A compression coil spring 114 is installed on the right end of the secondary sheave shaft 62. The movable-sheave half 72b is biased in the left direction by the compression coil spring 114. The shaft center of the fixing-sheave half 72a forms a slide collar in the shape of a cylinder, and is engaged with the secondary sheave shaft 62 by a spline.

The reduction ratio of the CVT 30 is determined by the comparison between the strength of the roller weight 113 pushing the movable-sheave half 71b of the primary sheave 71 in the right direction and the strength of the compression coil spring 114 pushing the movable-sheave half 72b of the secondary sheave 72 in the left direction.

More specifically, when the rotational speed of the primary sheave shaft 46c increases, the roller weight 113 is subject to the centrifugal force to move outward in the radial direction, and pushes the movable-sheave half 71b in the right direction. This moves the movable-sheave half 71b in the right direction, and the radius of the primary sheave 71 for winding the belt increases. Accordingly, the radius of the secondary sheave 72 for winding the belt decreases. The movable-sheave half 72b of the secondary sheave 72 moves in the right direction, counteracting the force given by the compression coil spring 114. As a result, the radius of the V belt 73 at the primary sheave 71 increases, while the radius at the secondary sheave 72 decreases. Accordingly, the reduction ratio decreases.

In contrast, when the rotational speed of the primary sheave shaft 46c decreases, the centrifugal force applied to the roller weight 113 decreases. The roller weight 113 moves inside in the radial direction along the cam surface 111 of the movable-sheave half 71b and the cam plate 112. Consequently, the force given by the roller weight 113 pushing the movable-sheave half 71b in the right direction decreases. As a result, the force given by the compression coil spring 114 becomes relatively greater than the above-mentioned force. Therefore, the movable-sheave half 72b of the secondary sheave 72 moves in the left direction. Accordingly, the movable-sheave half 71b of the primary sheave 71 moves also in the left direction. As a result, the radius of the V belt at the primary sheave 71 decreases, while the radius at the secondary sheave 72 increases. Finally, the reduction ratio increases.

As shown in FIG. 6, the outer case 53b has a first protruding section 93 and a second protruding section 94 in the shape of a bowl protruding outward (on the right side) in the width direction of the vehicle. The first protruding section 93 and the second protruding section 94 are linearly arranged in the front-to-rear direction. The first protruding section 93 covers the primary sheave 71, while the second protruding section 94 covers the secondary sheave 72.

A sealing ditch 68a is formed on the left side of the periphery of the inner case 53a. The right periphery of second case block 35b is engaged with the sealing ditch 68a. An O-ring 68 is inserted in sealing ditch 68a between the inner case 53a and the second case block 35b. A sealing ditch 69a is formed on the right side of the periphery of the inner case 53a. The periphery of outer case 53b is engaged with the sealing ditch 69a. An O-ring 69 is inserted in sealing ditch 69a between the inner case 53a and the outer case 53b. The outer case 53b and the second case block 35b hold the inner case 53a between them, and fixated by a bolt 70.

As shown in FIG. 7, the centrifugal clutch 41 is installed to the left side of the secondary sheave shaft 62. The centrifugal clutch 41 is a wet-type multiple disc clutch, and has a clutch housing 78 and a clutch boss 77 generally in the shape of a cylinder. The clutch housing 78 is engaged with the secondary sheave shaft 62 by a spline, and rotates with the secondary sheave shaft 62. A plurality of clutch plates 79 in the shape of a ring is installed to the clutch housing 78. The clutch plates 79 are arranged in the axial direction of the secondary sheave shaft 62 at intervals.

A gear 80 in the shape of a cylinder is installed in a rotatable manner via two bearings 81 (81a and 81b) to the periphery on the left side of the secondary sheave shaft 62. Bearings 81 are the first bearing mentioned above, while the gear 80 is the body of rotation mentioned above. The clutch boss 77 is positioned in the clutch plate 79 in the radial direction and outside in the radial direction of the gear 80, and engages the gear 80. Thus the gear 80 rotates with the clutch boss 77. A plurality of friction plates 82 in the shape of a ring is installed outside of the clutch boss 77 in the radial direction. The friction plates 82 are arranged in the axial direction of the secondary sheave shaft 62 at intervals. Each of the friction plates 82 is positioned between adjacent clutch plates 79.

The two bearings 81 (81a and 81b) installed between the gear 80 and the secondary sheave shaft 62 are cage-and-roller needle bearings, a type of needle bearing. The bearings 81 are, as shown in FIG. 8, formed with a plurality of needle rollers 130 and a housing 131 for positioning and arranging the needle rollers 130 at certain intervals on a circle with certain pitches. The bearings 81 as the cage-and-roller needle bearings do not have an outer ring (shell) for holding a housing with arranged needle rollers, as is used for a shell-type needle bearing and a solid-type needle bearing. A plurality of openings 131a on housing 131 have a structure for preventing the needle rollers 130 from falling inside in the radial direction or falling outside in the radial direction by holding them.

A plurality of cam surfaces 83a is formed on the left side of the clutch housing 78. A roller weight 84a is positioned between the cam surfaces 83a and the clutch plate 79 in the rightmost position facing the cam surface 83a.

When the centrifugal clutch 41 is used, a clutch-in state (a connected state) and a clutch-off state (a disconnected state) are automatically switched according to the strength of the centrifugal force given to the roller weight 84a.

More specifically, when the rotational speed of the clutch housing 78 reaches or exceeds a certain speed, the roller weight 84a is affected by the centrifugal force and moves outward in the radial direction. Accordingly, the clutch plate 79 is pushed by the roller weight 84a in the left direction. As a result, the clutch-in state is provided, where the clutch plate 79 and the friction plates 82 are pressed onto each other, and the drive power of the secondary sheave shaft 62 is transmitted to a power output shaft 85 via the gear 80 and the decelerator 42. In this state, the gear 80 rotates with the clutch boss 77, and the secondary sheave shaft 62 rotates with the clutch housing 78. Consequently, the gear 80 and the secondary sheave shaft 62 rotate at the same time, and do not relatively rotate.

In contrast, when the rotational speed of the clutch housing 78 is below a certain speed, the centrifugal force acted on the roller weight 84a is reduced. The roller weight 84a moves inward in the radial direction. As a result, the clutch-off state is provided, where the clutch plate 79 and the friction plates 82 are released from the pressure, and the drive power of the secondary sheave shaft 62 is not transmitted to the output shaft 85 via the gear 80 and the decelerator 42. In this state, the drive power is not transmitted to the gear 80. As the drive power is transmitted only to the secondary sheave shaft 62, the secondary sheave shaft 62 rotates. Therefore, the gear 80 and the secondary sheave shaft 62 relatively rotate. In FIG. 7, the section on the front side of the centrifugal clutch 41 (the upper side of FIG. 7) shows the clutch-off state, while the section on the rear side (the lower side of FIG. 7) shows the clutch-in state.

As shown in FIG. 7, the bearing 76 is a ball bearing. The bearing 76 has an inner ring 76a, into which the secondary sheave shaft 62 is inserted, an outer ring 76b, which is fixed on the second case block 35b, and a ball 76c, which is arranged between the inner ring 76a and the outer ring 76b. The inner ring 76a rotates with the secondary sheave shaft 62. On the other hand, the outer ring 76b is fixed on the second case block 35b, and does not move at all.

A washer 86 is inserted between the gear 80 and the bearing 76. The washer 86 covers a side of the inner ring 76a of the bearing 76, but does not cover a side of the outer ring 76b. The washer 86 covers the whole part of a side of the bearing 81a and part of a side of the gear 80. As the washer 86 is inserted, the gear 80, into which the bearing 81a is inserted, and the outer ring 76b of the bearing 76 are spaced apart a certain distance.

When the centrifugal clutch 41 is in the clutch-in state and the secondary sheave shaft 62 rotates, the inner ring 76a of the bearing 76 and the gear 80 rotate with each other, while the outer ring 76b of the bearing 76 and the gear 80 relatively rotate. In addition, while the gear 80 rotates, the gear 80 is given the thrust force in the side direction of the bearing 76 (in the left direction in the drawing). Accordingly, if the washer 86 is not inserted, the outer ring 76b of the bearing 76 and the gear 80 are in contact with each other while they relatively rotate. This causes damages to the gear 80 and the bearing 76. In other words, in the embodiment, the washer 86 inserted between the bearing 76 and the gear 80 prevents the gear 80 and the outer ring 76b from being in contact with each other, so that damage to the gear 80 and the bearing 76 can be prevented.

A very large thrust force occurs on the gear 80 if the brake pedal 84 is operated to lock the rear wheel 26, the rotational speed of the engine is increased in a short time, and finally the centrifugal clutch 41 is switched to the clutch-in state. Therefore, if the bearing 76 and the gear 80 are in contact with each other, the gear 80 presses the bearing 76 with extraordinarily large force. It is therefore highly possible that the gear 80 and the bearing 76 are in danger of damage. With this considered, as seen in the embodiment, the washer 86 is inserted in order to prevent the gear 80 and the bearing 76 from being damaged.

The decelerator 42 is disposed between the centrifugal clutch 41 and the output shaft 85. The decelerator 42 has a transmission shaft 100 arranged in parallel with the secondary sheave shaft 62 and the output shaft 85. The transmission shaft 100 is rotationally supported by the first case block 35a via a shaft bearing 101, and rotationally supported by the second case block 35b via a shaft bearing 102. A first transmission gear 103 engaged with gear 80 is installed to the right end of the transmission shaft 100. The first transmission gear 103 and the gear 80 are helical gears. They are so arranged that the thrust force is generated in the direction of the bearing 76 (in the left direction of the drawing) when they rotate.

A second transmission gear 104, which has a diameter smaller than that of the first transmission gear 103, is installed to the center part of the transmission shaft 100. A third transmission gear 105 engaged with the second transmission gear 104 is formed on the outer periphery on the right end of the output shaft 85. The inner side of the right end of the output shaft 85 is supported by the left end of the secondary sheave shaft 62 via a bearing 106. As a result, the output shaft 85 is rotationally supported by the secondary sheave shaft 62 via the bearing 106, and positioned on the same axial line (on the same straight line) with the secondary sheave shaft 62. The center part of the output shaft 85 is rotationally supported by the left end of the second case block 35b via a shaft bearing 107.

In this structure, the clutch boss 77 and the output shaft 85 are connected via the gear 80, the first transmission gear 103, the transmission shaft 100, the second transmission gear 104, and the third transmission gear 105. Consequently, the output shaft 85 rotates with rotation of the clutch boss 77.

The left end of the output shaft 85 passes through the first case block 35a, and protrudes out of the left side of the crankcase 35. A drive sprocket 108 is fixed on the left end of the output shaft 85. A chain 109 for transmitting the drive force of the output shaft 85 to the rear wheel 26 is engaged with the drive sprocket 108. The mechanism for transmitting the drive force of the output shaft 85 to the rear wheel 26 is not limited to the chain 109, and can instead be a transmission belt, a gear mechanism formed with a plurality of gears, a drive shaft, or any other member.

A mechanism for supplying lubricating oil in the engine unit 28 is now described. FIG. 9 is a cross-sectional view of part of the internal structure of the engine unit 28. Vehicle 10 is equipped with a lubricating oil supply mechanism having a structure in which an oil pump 116 draws lubricating oil into a lubricating oil chamber 115 formed at a bottom 35c of the crankcase 35 and supplies it to the crankshaft 46 and bearings and sliding portions on and around the secondary sheave shaft 62 (see FIG. 7). The lubricating oil having lubricated such parts falls due to gravity and then returns to the lubricating oil chamber 115. The mechanism for supplying lubricating oil is so constructed that lubricating oil is also supplied to bearing 76, the washer 86, the bearing 81a (see FIG. 7), and their sliding portions.

The oil pump 116 is positioned in a lower part of the crankcase 35, having a structure in which a pump shaft 116a is supported by a housing 117 forming an intake 117a and an outlet 117b and a pump gear 118 is installed to the outer periphery of the pump shaft 116a.

An intake path 35d connected to the intake 117a is formed in the crankcase 35. The intake path 35d has an opening in the lubricating oil chamber 115 with an oil strainer 119 between them. A lubricating-oil supply path 35e connected with the outlet 117b is formed in the crankcase 35. The lubricating-oil supply path 35e is connected with an oil filter 200 before connected with a main supply path 66a formed in the generator case 66. The downstream end of the main supply path 66a is connected with an oil chamber 66c next to the left end of the crankshaft 46.

An oil path 46d connected with oil chamber 66c is formed in crankshaft 46. Oil path 46d passes through the shaft center of the crankshaft 46 and is connected with an opening on a surface 121, where the crank pin 59 and the connecting rod 51 are connected, via a diverging path 59a formed in the crank pin 59.

Lubricating oil drawn by the oil pump 116 passes through the lubricating-oil supply path 35e and the main supply path 66a, is delivered by the pressure into the oil path 46d, and supplied to the surface 121 via the oil path 46d and the diverging path 59a. Having been supplied to the surface 121, lubricating oil is scattered in the crankcase 35 by the pressure for supplying lubricating oil and by the centrifugal force of the crankshaft 46. Some portions of lubricating oil being scattered in the crankcase 35 reach the secondary sheave shaft 62, and are supplied to bearings installed to the secondary sheave shaft 62 and sliding portions facing such bearings. After lubricating such bearings and sliding portions, lubricating oil falls into the lubricating oil chamber 115.

FIG. 10 is a cross-sectional view in the vicinity of the secondary sheave shaft 62 and the transmission shaft 100 in the engine unit 28. As shown in FIG. 10, an intake opening 203 for leading lubricating oil scattered from the surface 121 as shown in FIG. 9 to the secondary sheave shaft 62 and the transmission shaft 100 is formed in the crankcase 35.

A guide 204 extending in the direction of the secondary sheave shaft 62 is integrally formed in the crankcase 35. The guide 204 is positioned on the straight line passing the crankshaft 46 and the secondary sheave shaft 62, and has a lubricating-oil wall 204a vertically extending and generally facing the intake opening 203 and a leading part 204b extending in the shape of an arc from the lower end of the lubricating-oil wall 204a and making a curve line around the lower part of the secondary sheave shaft 62.

As the guide 204 is formed, the lubricating oil having entered the intake opening 203 is received by the lubricating-oil wall 204a, guided to the vicinity of the clutch boss 77, subjected to the centrifugal force of the clutch boss 77 and the secondary sheave shaft 62, and finally supplied to the bearings 81 (81a and 81b), the gear 80, the washer 86, the bearing 76, their sliding portions, and so forth.

As mentioned above, in the embodiment, the secondary sheave shaft 62 is supported in a cantilever fashion by the bearing 75 and the bearing 76 (a state where a shaft is supported in a cantilever fashion is explained later). In addition, the bearings 81 inserted between the secondary sheave shaft 62 and the gear 80 are formed with needle bearings. Consequently, the embodiment does not cause a case where a mutual prying motion occurs between the secondary sheave shaft 62 and the gear 80 leading the outer wheel and the inner wheel of a metal bearing to be in contact with each other as is seen when a metal bearing is adopted. As a result, abrasions and deterioration of the bearings 81 is reduced.

Moreover, since the bearings 81 are needle bearings with needle rollers 130 of a small diameter, enlargement of the bearings 81 (especially, enlargement of its diameter) is prevented. Therefore, enlargement of the engine unit 28 is prevented. Should ball bearings be adopted instead of needle bearings, the rollers in the shape of a ball in the ball bearings would enlarge the diameter by the amount as much as the size of the ball. Accordingly, the apparatus is enlarged if such ball bearings are inserted between the secondary sheave shaft 62 and the gear 80.

In the embodiment, the gear 80 is installed so that it rotates with the clutch boss 77. In the clutch-in state, where the drive power is transmitted from the clutch housing 78 to the clutch boss 77, the gear 80 rotates with the secondary sheave shaft 62. Therefore, the amount of the mutual prying motion caused by the gear 80 and the secondary sheave shaft 62 is small. In the clutch-off state, where the drive power is not transmitted to the clutch boss 77, the gear 80 and the secondary sheave shaft 62 relatively rotate. In this state, however, the rotational speed of the engine is low. Consequently, the amount of the mutual prying motion caused by the gear and the secondary sheave shaft is also small. As a result, where the gear 80 is installed so that it rotates with the clutch boss 77, abrasions and deterioration of the bearings 81 formed with needle bearings are surely suppressed.

In addition, cage-and-roller needle bearings, a type of needle bearing, are adopted as the bearings 81 in the embodiment. The bearings 81, as cage-and-roller needle bearings, are formed with the needle rollers 130 and the housing 131, and do not have an outer ring for fixing the housing 131. Therefore, the bearings 81 have a small diameter. Accordingly, enlargement of the engine unit 28 can be further prevented.

Since cage-and-roller needle bearings do not have an outer ring, it is necessary to enhance the rigidity of the housing 131. For this purpose, it is necessary to elongate the distances between each needle roller 130 positioned by the housing 131 at certain intervals on a circle with certain pitches. This reduces the number of the bearings 81 positioned by the needle rollers 130. However, as seen in the embodiment, it is only in the clutch-off state that the gear 80 and the secondary sheave shaft 62 relatively rotate in a structure where the gear 80 rotates with the clutch boss 77. Therefore, the number of rotations is relatively small. This means that the rigidity in the radial directions necessary for the bearings 81 becomes relatively low. As a result, it is possible to use cage-and-roller needle bearings, which are not expensive, as the bearings 81.

Moreover, in the embodiment, the washer 86 is inserted between the bearing 76 and the gear 80. This makes a space between the gear 80 and the outer ring 76b and prevents the outer ring 76b of the bearing 76 and the gear 80 from being in contact with each other while they relatively rotate. Therefore, damage to the gear 80 and the bearing 76 is prevented.

A very large thrust force occurs to the gear 80 if the brake pedal 84 is operated to lock the rear wheel 26, the rotational speed of the engine is increased in a short time, and finally the centrifugal clutch 41 is switched to the clutch-in state. Therefore, if the bearing 76 and the gear 80 are in contact with each other, the gear 80 presses the bearing 76 with extraordinarily large force. It is therefore highly possible that the gear 80 and the bearing 76 are in danger of damage. With this considered, as seen in the embodiment, the washer 86 is inserted in order to prevent the gear 80 and the bearing 76 from being damaged.

Although the straddle type vehicle of the invention has been described as a two-wheel motor vehicle, the invention is not so limited and may instead be applied to other vehicles such as a four-wheel buggy and so forth.

In the present invention, a state where a shaft is supported in a cantilever fashion via a bearing (hereinafter refereed to as "one-end-support state") indicates a state where at least one end of a shaft is practically not supported by a bearing. For example, as shown in FIG. 11, a state where a shaft 150 is supported by a bearing 151 is a one-end-support state regardless of the position of the bearing 151. Especially, the amount of the mutual prying motion caused by the shaft 150 and a body of rotation (not shown) becomes large when the bearing 151 is not at the middle of the shaft 150, and a/l or b/l exceeds ½, where l is the length of the shaft 150, a is the distance between the bearing 151 and the right end of the shaft 150, and b is the distance between the bearing 151 and the left end of the shaft 150, as shown in FIG. 11. Accordingly, in a one-end-support state such as this, the effect of the invention is found explicitly. FIG. 11 shows a case where a/l exceeds ½.

In addition, for example, in a state where the shaft 150 is supported by two or more bearings as shown in FIG. 12, the amount of the mutual prying motion becomes relatively large when c/l or d/l exceeds ¼, where l is the length of the shaft 150, c is the distance between the bearing on the right end (a bearing 152) on the shaft 150 and the right end of the shaft 150, and d is the distance between the bearing on the left end (the bearing 151) and the left end of the shaft 150. Accordingly, in a one-end-support state such as this, the effect of the invention is found explicitly. FIG. 12 shows a case where the shaft 150 is supported by two bearings (the bearings 151 and 152), and c/l exceeds ¼.

The described embodiment provides a structure where the washer 86 is inserted between the bearing 76 and the gear 80 to provide a space between the outer ring 76b of the bearing 76 and the gear 80, which relatively rotate, and they are prevented from being in contact with each other. As illustrated by the example described below, the method for arranging the outer ring 76b of the bearing 76 and the gear 80 with a space between them is not limited to this example.

FIG. 13 is a cross-sectional view of part of the internal structure of an engine unit according to another embodiment.

In FIG. 13, reference numerals and symbols of the same components as those of the engine unit 28 in FIG. 7 are as used in FIG. 7. In FIG. 13, to an engine unit 128, a circlip 126 is attached, being in contact with the right surface of the bearing 76. Washer 86 is inserted between circlip 126 and the bearing 81a. The engine unit 128 shown in FIG. 13 is given the same effect as is given to the engine unit 28.

FIG. 13 illustrates a case where circlip 126 and washer 86 are inserted between bearing 76 and gear 80. However, as shown in FIG. 13, it is also possible to insert only the circlip 126 when the circlip 126 is so large that it covers part of a side surface of the gear 80. This is because the circlip 126 prevents the gear 80 from being in contact with the outer ring 76b even if the gear 80 is affected by the thrust force and moves in the left direction. On the other hand, when the circlip 126 covers only the side surface of the bearing 81a, it is necessary to insert the washer 86 in order to cover part or the whole part of the side surface of the gear 80.

FIG. 14, which is a cross-sectional view illustrating part of the internal structure of an engine unit according to another embodiment, is another example of a case where the outer ring of a bearing and the gear are positioned at a certain distance from each other. In FIG. 14, reference numerals and symbols of the same components as those of the engine unit 28 in FIG. 7 are as used in FIG. 7.

In FIG. 14, a bearing 176 is installed to an engine unit 228, instead of the bearing 76 shown in FIG. 7. No component is inserted between the bearing 176 and the bearing 81a. The bearing 176 is a ball bearing, and has an inner ring 176a, into which the secondary sheave shaft 62 is inserted, an outer ring 176b fixed on the second case block 35b, and ball rollers 176c arranged between the inner ring 176a and the outer ring 176b.

The width of the inner ring 176a is larger than that of the outer ring 176b. The right end of the inner ring 176a protrudes to the side of the bearing 81a, and is in contact with the bearing 81a and the gear 80. The right side of the inner ring 176a covers the whole part of a side of the bearing 81a and part of a side of the gear 80. In the engine unit 228 of FIG. 14, the inner ring 176a positions the outer ring 176b and the gear 80 with a space between them. Accordingly, the same effect as is given to the engine unit 28 is obtained.

FIG. 15, which shows a cross-sectional view illustrating part of the internal structure of an engine unit according to another embodiment, is another example of a case where the outer ring of a bearing and the gear are positioned at a certain distance from each other. In FIG. 15, reference numerals and symbols of the same components as those of the engine unit 28 in FIG. 7 are as used in FIG. 7.

In FIG. 15, a gear 180 is installed to an engine unit 328, instead of the gear 80 in FIG. 7. No component is inserted between the bearing 76 and the gear 180. The gear 180 has an outer periphery chamfered along the side of the bearing 76. The outer periphery forms a slope 180a. Therefore, as shown in FIG. 15, when the bearing 76 and the gear 180 are in contact with each other, the inner ring 76a and the gear 180 come in contact with each other, but the outer ring 76b and the gear 180 are positioned at a certain distance from each other. Accordingly, the case shown in FIG. 15 is given the same effect as is given to the engine unit 28.

For the inner ring 76a and gear 180 to be in contact with each other, it is desirable that the gear 180 be so designed that a maximum amount of a contacting area can be given as shown in FIG. 15. In FIG. 15, the gear 180 has a shape part of which covers the left side of the bearing 81a, and is contact with almost the whole part on a side of the inner ring 76a. When the contacting area between the gear 180 and the inner ring 76a is enlarged as mentioned above, these components are not easily damaged even if the thrust force makes the gear 180 press the inner ring 76a. In a structure where the gear 180 and the inner ring 76a of the bearing 76 are in contact with each other as shown in FIG. 15, it is desirable that a sufficient amount of lubricating oil be supplied for the sake of preventing abrasions and deterioration.

The invention claimed is:

1. An engine unit comprising:
   a single rotational shaft arranged to be rotated by a drive force provided thereto, the single rotational shaft extending in a width direction of the engine unit;
   a first bearing into which the single rotational shaft is inserted;
   a secondary sheave including a fixed sheave and a movable sheave and arranged to be driven by a primary sheave, the secondary sheave being mounted to a first end portion of the single rotational shaft;
   a clutch mounted on the single rotational shaft via the first bearing and arranged closer to a center of the engine unit in the width direction of the engine unit than the first end portion of the single rotational shaft and the secondary sheave;
   a body of rotation into which the first bearing is inserted; and
   a second bearing into which the single rotational shaft is inserted, wherein
   the single rotational shaft is supported in a cantilever fashion via the second bearing;
   the first bearing is a needle bearing; and
   the first bearing is positioned between two second bearings juxtaposed to each other in an axial direction of the single rotational shaft.

2. The engine unit according to claim 1, wherein:
   the clutch includes a clutch housing and a clutch boss, wherein
   the body of rotation is a gear rotating with the clutch boss.

3. The engine unit according to claim 1, wherein the first bearing includes a plurality of needle bearings juxtaposed to each other in an axial direction of the single rotational shaft.

4. The engine unit according to claim 1, wherein the needle bearing is a cage-and-roller needle bearing.

5. The engine unit according to claim 1, further comprising:
   a V-belt-type continuously variable transmission, wherein
   the single rotational shaft is a sheave shaft of the V-belt-type continuously variable transmission.

6. The engine unit according to claim 1, wherein the second bearing comprises:
   an inner ring into which the single rotational shaft is inserted; and
   an outer ring that is positioned outside of the inner ring in a radial direction of the single rotational shaft and is rotatable relative to the inner ring, and the body of rotation and the outer ring are spaced apart a predetermined distance from each other in an axial direction of the single rotational shaft.

7. The engine unit according to claim 6, further comprising:
   a spacer interposed between the body of rotation and the second bearing, wherein
   the body of rotation and the outer ring of the second bearing are spaced apart the predetermined distance from each other via the spacer.

8. The engine unit according to claim 7, wherein the spacer is a washer.

9. The engine unit according to claim 7, wherein the spacer is a circlip.

10. The engine unit according to claim 6, wherein the inner ring extends further than the outer ring toward the body of rotation, and the body of rotation and the inner ring are in contact with each other in order for the body of rotation and the outer ring to be spaced apart the predetermined distance from each other.

11. The engine unit according to claim 6, wherein part of the body of rotation is removed in order for the body of rotation not to be in contact with the outer ring when the body of rotation and the inner ring come in contact with each other.

12. The engine unit according to claim 6, further comprising:
   a V-belt-type continuously variable transmission, wherein the clutch includes a clutch housing and a clutch boss; and the body of rotation is a gear rotating with the clutch boss, and the single rotational shaft is a secondary sheave shaft of the V-belt-type continuously variable transmission.

13. The engine unit according to claim 6, further comprising:
   a mechanism arranged to supply lubricating oil at least to a portion of the single rotational shaft where the body of rotation and the second bearing are installed.

14. A straddle type vehicle comprising the engine unit of claim 1.

15. The engine unit according to claim 1, wherein the first bearing includes two needle bearings arranged to mount the body of rotation and the clutch to the single rotational shaft.

16. The engine unit according to claim 1, wherein the body of rotation is arranged on the single rotational shaft on an opposite side of the clutch from the secondary sheave.

17. The engine unit according to claim 1, wherein the body of rotation meshes with a transmission gear mounted to a transmission shaft.

18. The engine unit according to claim 1, wherein the body of rotation is a helical gear.

* * * * *